(12) United States Patent
Thompson et al.

(10) Patent No.: US 7,431,221 B2
(45) Date of Patent: Oct. 7, 2008

(54) LOCK ASSEMBLY FOR A MULTIPLE STAGE FOLDING BOOM ASSEMBLY

(75) Inventors: Dennis G. Thompson, Saskatoon (CA); Dennis W. Chahley, Martensville (CA)

(73) Assignee: CNH Canada, Ltd. (CA)

( * ) Notice: Subject to any disclaimer, the term of this patent is extended or adjusted under 35 U.S.C. 154(b) by 771 days.

(21) Appl. No.: 11/130,451

(22) Filed: May 16, 2005

(65) Prior Publication Data

US 2006/0255175 A1    Nov. 16, 2006

(51) Int. Cl.
  *B05B 1/20* (2006.01)
  *B05B 15/06* (2006.01)
(52) U.S. Cl. .................. 239/166; 239/167; 239/168
(58) Field of Classification Search .......... 239/146, 239/159–170, 172; 172/311, 457
See application file for complete search history.

(56) References Cited

U.S. PATENT DOCUMENTS

| | | | |
|---|---|---|---|
| 978,082 A | 12/1910 | Wallace | |
| 1,470,246 A | 10/1923 | Willis et al. | |
| 2,657,949 A | 11/1953 | Morrison | |
| 3,904,118 A | 9/1975 | Farmery | |
| 4,379,522 A | 4/1983 | Elliott et al. | |
| 4,529,040 A * | 7/1985 | Grollimund | 172/311 |
| 4,529,043 A * | 7/1985 | Jensen et al. | 172/776 |
| 4,588,128 A | 5/1986 | Broyhill et al. | |
| 4,615,397 A * | 10/1986 | Hastings | 172/776 |
| 4,867,245 A * | 9/1989 | Stevens | 172/311 |
| 5,310,115 A | 5/1994 | Broyhill | |
| 5,992,759 A | 11/1999 | Patterson | |
| 6,012,648 A | 1/2000 | Morris | |

FOREIGN PATENT DOCUMENTS

| | | |
|---|---|---|
| DE | 41 38 213 | 5/1993 |
| EP | 0 224 166 | 6/1987 |

* cited by examiner

Primary Examiner—Darren W Gorman
(74) Attorney, Agent, or Firm—Rebecca Henkel

(57) ABSTRACT

A lock assembly is provided to secure a multi-stage folding boom assembly having left and right booms, each boom having an middle section that pivots about a vertical axis with respect to an inner section, an outer section that pivots about a second vertical axis with respect to the middle section. The lock assembly includes a first interlock portion that receives a second interlock portion when the first section pivots laterally inward about the first vertical axis with respect to the second section to a first stage folded position. As the middle section pivots forward and laterally inward toward a second stage folded position with respect to the third section, the first interlock portion slidably moves and interlocks with the second interlock portion to restrain the outer section from falling out of alignment with respect to the middle section.

20 Claims, 7 Drawing Sheets

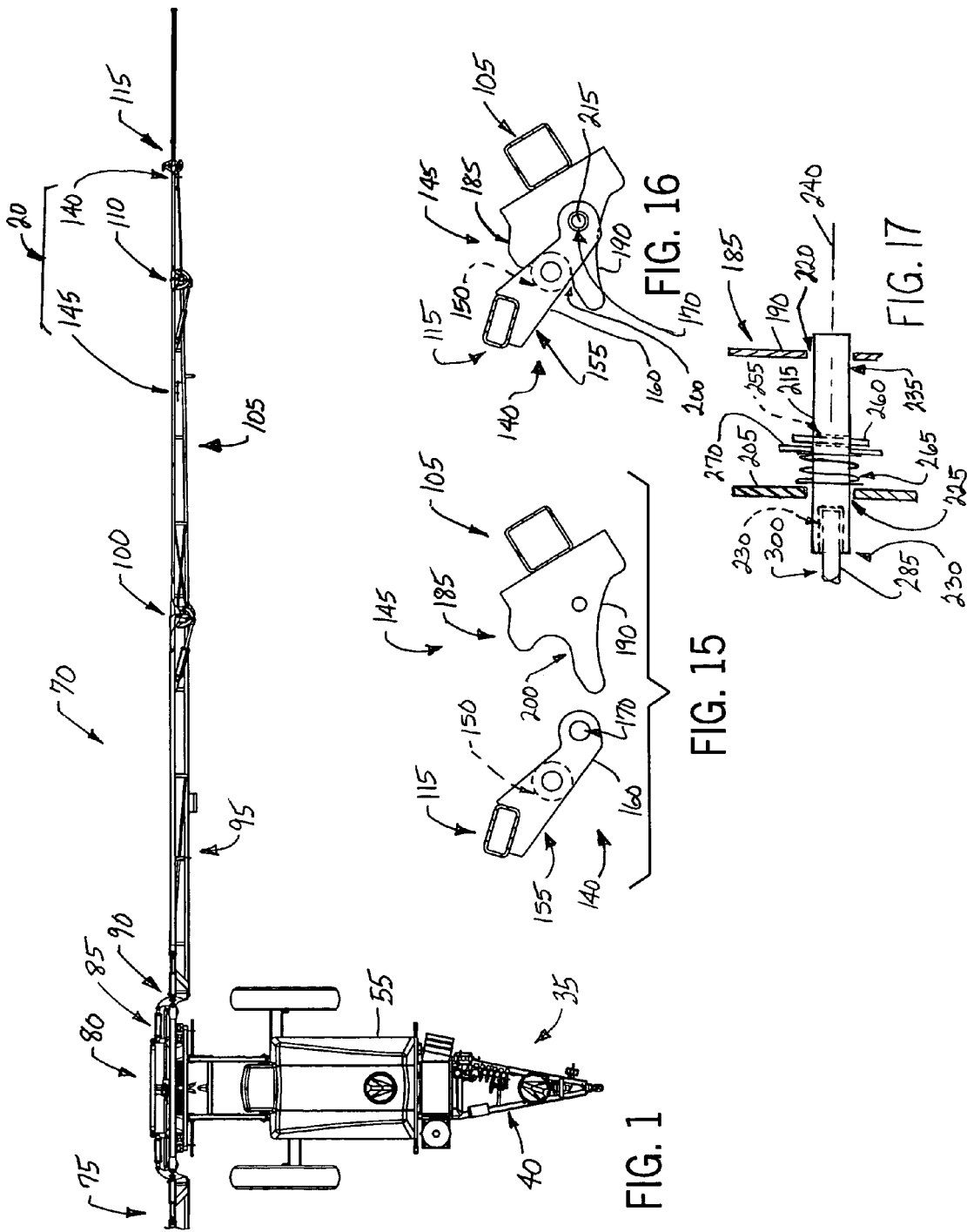

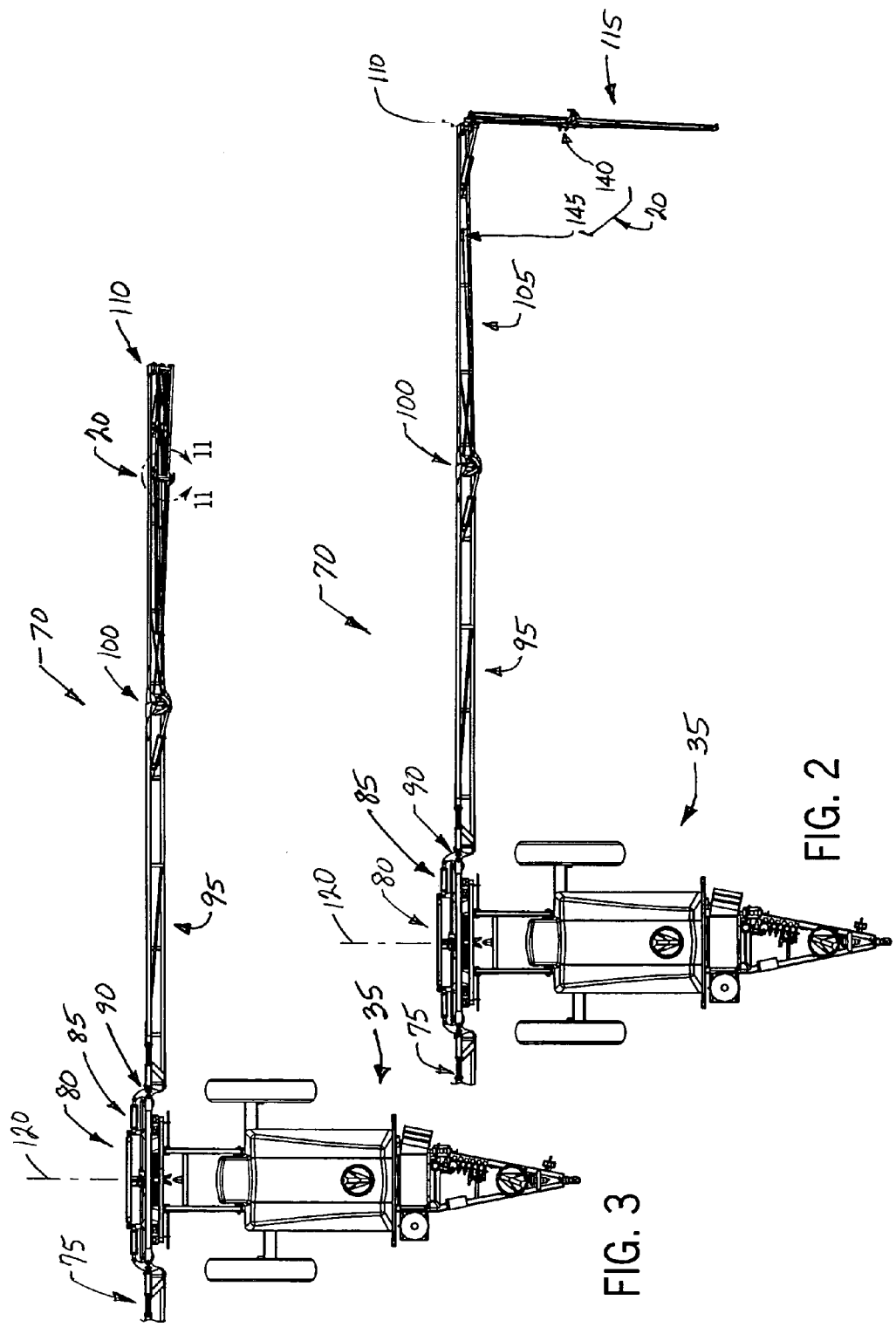

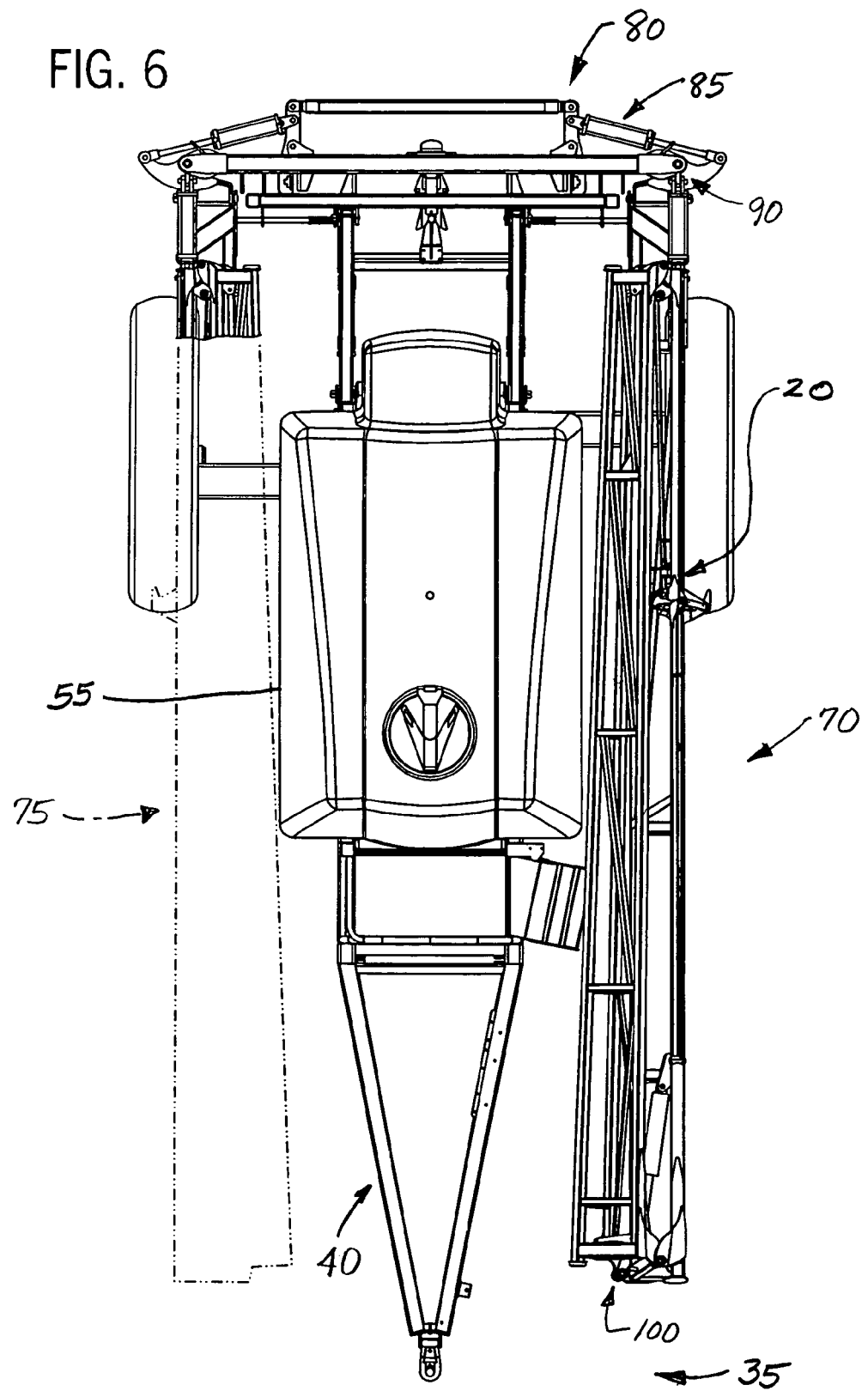

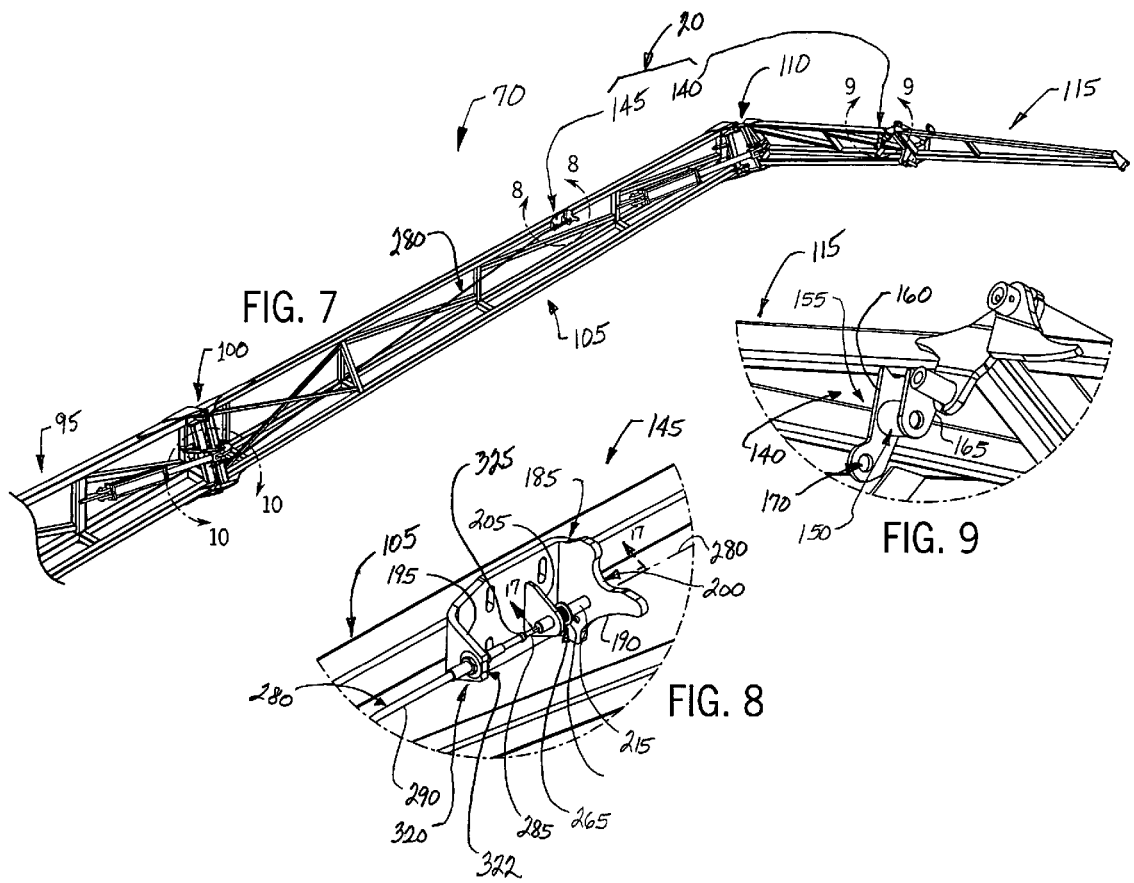

LOCK ASSEMBLY FOR A MULTIPLE STAGE FOLDING BOOM ASSEMBLY

FIELD OF THE INVENTION

The invention relates to a lock assembly for a multiple stage folding boom, and more specifically, relates to an intermediate lock assembly configured to automatically lock an outer section with respect to a middle section during a folding/unfolding sequence of the outer and middle sections with respect to an inner section of the multi-stage folding boom.

BACKGROUND OF THE INVENTION

Boom assemblies are commonly used on agricultural vehicles or towed implements (e.g., sprayers or planters, etc.) to dispense seed, fertilizer, insecticide, herbicide, etc. and other miscellaneous agricultural materials. The typical boom assembly is configured to pivot or fold between operative and inoperative positions relative to the boom support vehicle. In an operative position, the boom assembly commonly extends in a laterally outward direction from the boom support vehicle up to a distance of ninety feet or larger such that the agricultural applicator covers a large surface area with each pass across a field. The weight of the boom assembly generally correlates with its operative length.

Upon completing distribution of the agricultural materials to the field, a conventional pivot mechanism (e.g. hydraulic, pneumatic, etc.) is employed to swing, pivot or fold each of the booms to a folded position for transport. The preferred folded position of the boom assembly is generally parallel to the direction of travel of the support vehicle such that each of the booms and the support vehicle has a narrow profile for ready transport from the field to a roadway.

Typical boom assemblies include a left and right boom each pivotal about a stationary, central mainframe structure. Dual-stage folding boom assemblies comprise left and right booms each having an outer section and an inner section. Each outer and inner section is pivotal about a primarily vertical axis between an extended and a folded position. The outer section folds inward onto the inner section, and the inner section folds inward alongside the stationary mainframe structure of the agricultural implement to a stowed position on a cradle support structure ready for transport. With larger boom assemblies (e.g., each boom longer than one-hundred feet), each left and right boom typically includes three sections (outer, middle, inner) that requires three folding stages: the first stage includes the outer section folding onto the middle section, the second stage includes the outer and middle sections folding onto the inner section, and the third stage includes all three sections folding onto the cradle support structure at the mainframe of the agricultural implement. For booms that require three folding stages, the folding stages should be sequenced for the booms to fold and unfold properly. The first and second folding stages are typically controlled by a first hydraulic circuit, and the third folding stage is controlled by a second hydraulic circuit. The first folding stage typically folds first because the outer boom section is usually the lightest of the multiple boom sections, associated with the convention tapered shaped of the boom, and so does not require sequencing.

However, these certain known multiple-stage folding boom assemblies have drawbacks. For example, the outer boom section is known to unfold before the second folding stage is complete. In addition, gravitational effects are known to cause the outer section to fall out of alignment from being received by the cradle support structure for transport.

Therefore, there is a need or desire for a lock assembly that overcomes the foregoing difficulties and drawbacks of the prior art. The lock assembly should also be automatic, simple and reliable to operate, and economical to manufacture. In addition, the lock assembly should be configured to be utilized with a wide variety of vehicles or towed implements in addition to those related to agricultural sprayers.

SUMMARY OF THE INVENTION

The present invention provides an assembly for and a method of positively locking a spray section of a multi-section folding boom assembly that meets the desires and needs described above. The lock assembly of the present invention thus enhances the ready transition of the boom assembly from an extended, operative position to a folded position.

In a first embodiment of the present invention, a lock assembly is provided to secure a folding boom assembly with a boom having a first or outer section that pivots about a first vertical axis with respect to a second or middle section, the second or middle section that pivots about a second vertical axis with respect to a third or inner section, and the third or inner section that pivots about a third vertical axis with respect to a stationary boom support structure of the boom assembly. The lock assembly includes a first interlock portion and a second interlock portion. The second interlock portion is configured to receive the first interlock portion when the first section of the boom pivots laterally inward about the first vertical axis with respect to the second section. Upon the first and second sections pivoting laterally inward about the second vertical axis with respect to the third section, the second interlock portion slidably moves and interlocks with the second interlock portion to restrain the first section with respect to the second section.

The preferred first interlock portion is mounted at the first or outer section. The preferred second interlock portion includes a cylindrical-shaped or roller member configured to be received on a recessed surface at the first interlock portion in the first stage folded position of the boom assembly. The second interlock portion further includes a leg member having an opening extending therethrough configured to receive a lock pin of the second interlock portion that is slidably movable between an unlocked position and a locked position with respect to the first interlock portion so as to restrain the first or outer section with respect to the second or middle section of the boom. The preferred lock pin is biased by a spring toward a locked position with respect to the second interlock portion. The lock pin is slidably actuated by a cable slidably movable in a protective sleeve or shroud coupled at the boom assembly. The preferred cable includes a first end attached at the lock pin, and a second end is pivotally connected at the first or outer section. The second end of the cable is pivotally coupled by a yoke member to the third or inner section of the boom. The yoke includes a threaded opening configured to receive the second end of the cable. A jam nut is configured to adjustably position the second end of the cable with respect to the yoke.

In another embodiment, the present invention provides an agricultural sprayer that includes a boom support structure, a boom assembly, and a lock assembly. The boom assembly is supported on the boom support structure, and includes a boom having an outer section configured to pivot about a middle section in a laterally inward direction to a first-stage folded position with respect to the stationary boom support structure. The middle section is also configured to pivot in the laterally inward direction toward the stationary boom support structure. The lock assembly includes a cable member having a first end pivotally coupled at the boom assembly and a second end operatively connected to move a lock member from a locked position to an unlocked position so as to selectively restrain the outer section with respect to the middle section when the outer and middle sections in the first stage folded position pivot in the laterally inward direction toward the stationary boom support structure.

In accordance with another aspect of the invention, a method of operating a lock assembly for a multi-stage boom folding assembly is provided, substantially in accordance with the foregoing summary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 1 illustrates a top plan view of an agricultural sprayer implement having a boom assembly in an extended, operative position.

FIG. 2 illustrates a top plan view of the agricultural sprayer implement of FIG. 1, the boom assembly in a partial, first-stage folded position.

FIG. 3 illustrates a top plan of the agricultural sprayer of FIG. 1, the boom assembly in a full first-stage folded position.

FIG. 6 illustrates a top plan view of the agricultural sprayer of FIG. 1, the boom assembly in a fully folded inoperative, transport position.

FIG. 7 illustrates a detailed perspective view of the left boom of the boom assembly of FIG. 2.

FIG. 8 shows a detailed perspective view along line 8-8 in FIG. 7.

FIG. 9 shows a detailed perspective view along line 9-9 in FIG. 7.

FIG. 15 illustrates a detailed side elevation view of the lock assembly along line 15-15 in FIG. 12.

FIG. 16 illustrates a detailed side elevation view of the lock assembly along line 16-16 in FIG. 14.

FIG. 17 illustrates a detailed side cross-sectional view of the lock pin along line 17-17 in FIG. 8.

DETAILED DESCRIPTION OF THE PREFERRED EMBODIMENTS

Figure 4:
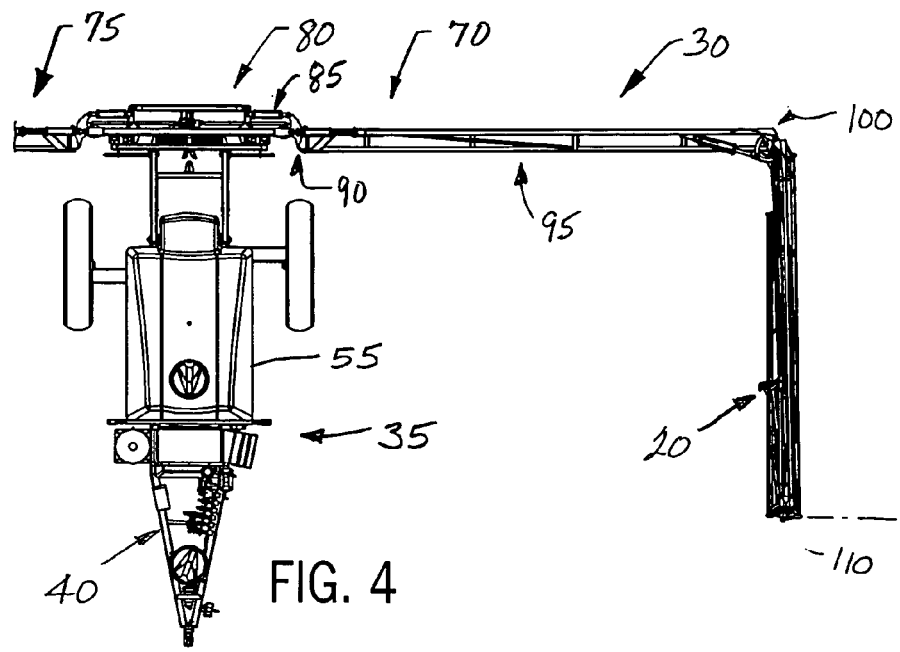
FIG. 4 illustrates a top plan view of the agricultural sprayer of FIG. 1, the boom assembly in a partial, second stage folded position.

FIGS. 1-5 generally show a lock assembly 20 in accordance with the present invention employed in combination with a boom assembly 30 mounted on a boom support implement or vehicle. The illustrated boom support implement is a conventional agricultural sprayer implement 35 of a type commonly used to apply crop pesticides, nutrients or animal/human waste (sludge) to soils, typically before and after planting in the spring and/or after harvest in the fall.

The illustrated sprayer implement 35 generally includes a mainframe structure 40 supported on plurality of oversized wheel assemblies 45 and a hitch 50 operable to be towed by a tow vehicle (not shown) across a field. The mainframe structure 40 is in support of a reservoir or storage tank 55 in fluid connection with a series of nozzles (not shown) mounted on the boom assembly 30. With the boom assembly 30 in the extended, operative position (FIG. 1), agricultural product is communicated in a known manner from the reservoir 55 to a series of spray nozzles on the boom assembly 30 for distribution across a wide surface area of the field.

Still referring to FIGS. 1-5, the boom assembly 30 generally includes a left boom 70 and a right boom 75, and a central, stationary boom support frame structure 80 in pivotal support of the left and right booms 70 and 75. The boom support frame structure 80 is generally a conventional tubular frame structure. Yet, it should be understood that other types of boom support frame structures 80 can employed in support of the left and right booms 70 and 75 and is not limiting on the invention.

The left and right booms 70 and 75 each are pivotable by a conventional pivot actuator mechanism(s) 85 in a known manner so as to move the booms 70 and 75 between the extended, operative position (FIG. 1) and the folded, inoperative position (FIG. 6). Although the illustrated pivot actuator mechanism 85 is hydraulic driven, it is understood that the type of pivot actuator mechanism 85 (e.g., hydraulic, pneumatic, manual, etc.) can vary.

As illustrated in FIGS. 1-5, the left boom 70 is mounted for rotation about a vertical axis 90 relative to the boom support frame structure 80 so as to move between the field position shown in FIG. 1 and the transport position shown in FIG. 6. The left boom 70 generally comprises three sections: an inner section 95 extending from the first vertical axis 90 to a second vertical axis 100, a middle section 105 extending from the second vertical axis 100 to a third vertical axis 110, and an outer section 115. In the extended, operative position shown in FIG. 1, the inner section 95, the middle section 105, and the outer section 115 are arranged co-linearly and extend laterally outward relative to a central longitudinal axis 120 of the implement 35.

Referring now to FIG. 7, the construction of each boom section 95, 105 and 115 is generally comprised of a triangular truss structure of square structural tubing. The inner section 95 generally comprises a pair of bottom rails which are generally aligned in a common horizontal plane, together with a top rail which is located generally between, and to the height above, the bottom rails. The rails are interconnected by a series of diagonal braces or the like which are arranged in accordance with good engineering practice to provide the required structural strength for the truss structure. The middle section 105 is similar in construction to that of the inner section 95, comprising a pair of bottom rails, a top rail, and a truss in a series of interconnecting braces. The first vertical axis 90 (See FIG. 6) is defined by a pivot connection assembly located at an inner end of the inner section 95, the second vertical axis 100 is defined by a pivot connection assembly located at the outer end of the inner section 95 and the inner end of the middle section 105, and the third vertical axis 110 is defined by a pivot connection assembly located at the outer end of the middle section 105 and the inner end of the outer section 115.

For the left boom 70 to fold and unfold properly, movement of the three sections 95, 105 and 115 are sequenced to move in three stages: a first stage that includes folding the outer section 115 about the third vertical axis 110 (See FIG. 2) to and from a first stage folded position (FIG. 3); a second stage that includes folding the middle section 105 about the second vertical axis 100 (See FIG. 4) to and from a second stage folded position (FIG. 5); and a third stage that includes folding the inner section 95 about the first vertical axis 90 to and from a third stage folded position for transport (FIG. 6). Preferably, the first and second stages of the folding sequence are typically commonly controlled by a common hydraulic circuit that is separate from another hydraulic circuit used to control the third stage of the folding sequence. The first stage preferably occurs first in the folding sequence because the outer boom section 115 is usually the lightest section due to the tapered shape of the boom 70 and therefore does not require sequencing.

Referring to FIGS. 7, and 11-15, the lock assembly 20 in accordance with the present invention is generally includes a first interlock portion 140 configured to be selectively interlocked by with respect to a second interlock portion 145 so as to secure the outer section 115 with respect to the middle section 105 in the first-stage folded position (See FIG. 3). Thereby, the lock assembly 20 prevents the outer section 115 from moving out of alignment or unfolding in association with miscellaneous forces (e.g., gravitational effects, centrifugal force, etc.) during the second and third stages of the folding sequence.

Referring specifically to FIG. 9, the first interlock portion 140 generally includes a cylindrical member or roller member 150 rotatably supported on a bracket member 155 mounted at the upper structural member of the outer section 115. The preferred bracket member 155 generally includes a first leg member 160 generally parallel to a second leg member 165 configured to rotatably support the roller member 150 therebetween. The preferred first leg member 160 includes an extended portion, relative to the second leg member 165 of the bracket member 155, with an opening 170 extending therethrough for reasons described later.

Referring now to FIG. 8, the second interlock portion 145 includes a cradle bracket assembly 185 mounted at the middle section 105 of the left boom 70. The preferred cradle bracket assembly 185 includes a generally u-shaped bracket having a first leg member 190 spaced apart from a second leg member 195. Both leg members 190 and 195 extend generally parallel to one another and transverse to the elongated length of the middle boom section 105 (See FIG. 7). The edge of the first leg member 190 includes a recessed or indented portion 200 configured to receive and seat the roller member 150 of the first interlock portion 140 in a smooth transition when the outer section 115 moves on to the middle section 105 in the first-stage folded position (See FIGS. 11, 15 an 16). The recessed portion 200 of the first leg member 190 is shaped to seat the roller member 150 in a manner so as resist the roller member 150 and the outer section 115 from slipping off the middle section 105, and to properly align the outer section 115 with the middle section 105 in the first-stage folded position (See FIG. 3). The cradle bracket assembly 185 further includes an intermediate leg member 205 disposed between the first and second leg members 190 and 195.

Figure 11:
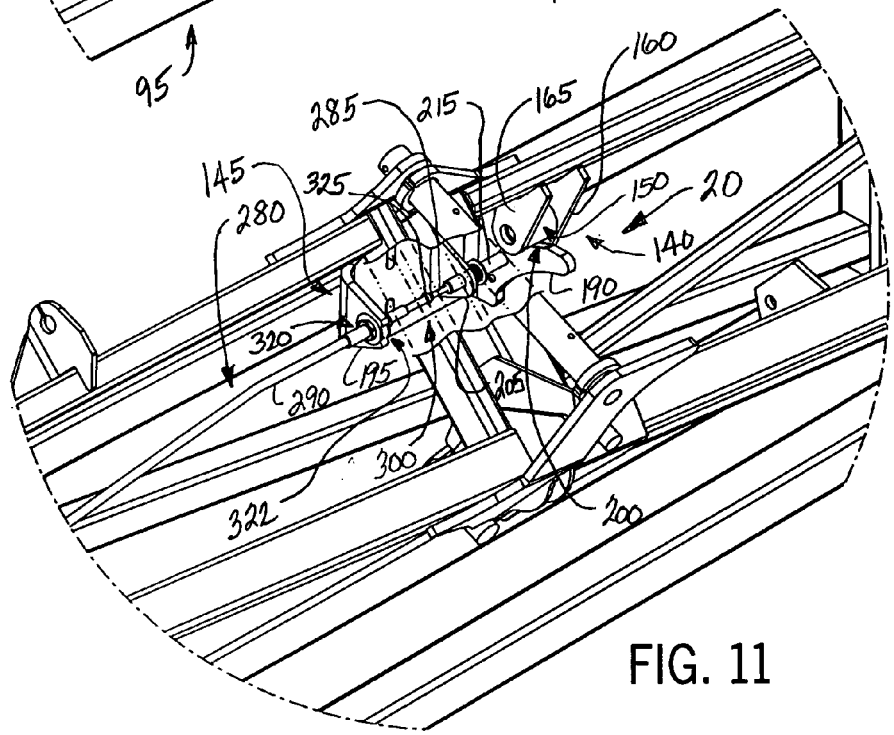
FIG. 11 illustrates a detailed perspective along line 10-10 in FIG. 3.
Figure 14:
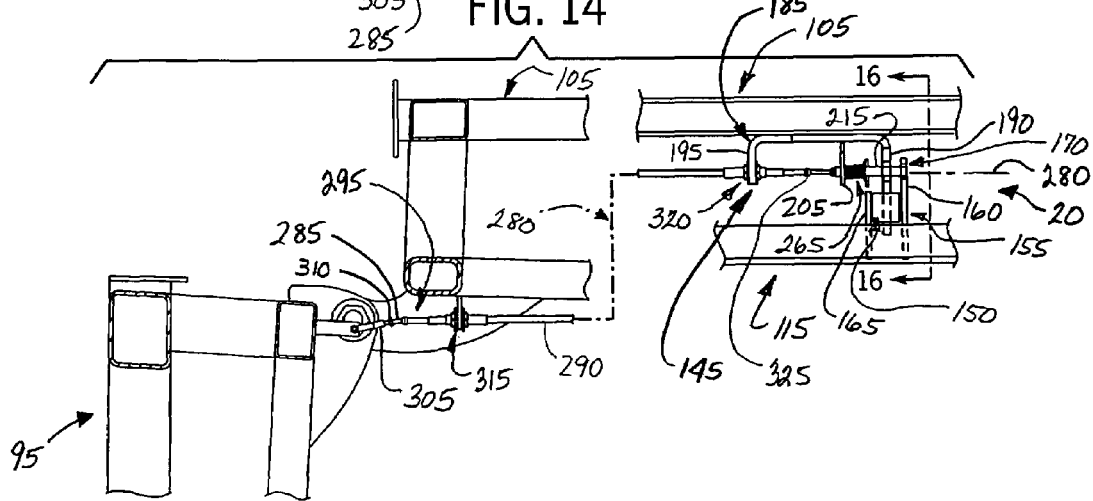
FIG. 14 illustrates a detailed schematic diagram of the lock assembly for the boom assembly in the partial second-stage folded position shown in FIG. 4.

Still referring to FIGS. 11, 14 and 17, the second interlock portion 145 further includes a lock pin 215 configured to selectively interlock the second interlock portion 145 with the first interlock portion 140 (FIGS. 11 and 14). As shown in FIG. 17, the lock pin 215 is slidably supported through an opening 220 through the first leg member 190 and an opening 225 extending through the intermediate leg member 205 in a manner that allows the lock pin 215 to slidably move between the locked and unlocked positions with respect to the first interlock portion 140 (FIGS. 11 and 14). The preferred lock pin 215 is generally cylindrical-shaped and includes a first end 230 and a second end 235 aligned along a longitudinal axis 240. The first end 230 of the lock pin 215 includes an aperture 245 generally aligned along the longitudinal axis 240 of the lock pin 215. The lock pin 215 further includes a second aperture 255 that is generally aligned perpendicular or transversely aligned relative to the longitudinal axis 240 of the lock pin 215 so as to receive a cotter pin 260 therethrough for reasons described later.

Referring to FIGS. 14 and 17, a spring 265 is mounted to bias the lock pin 215 toward the locked position with respect to the first interlock portion 140 (See FIG. 14). The preferred spring 265 is a compression-type and is of a diameter such that it is mounted to receiver the lock pin 215 therethrough. As shown in FIG. 17, the first end of the spring 265 is engaged against a face of the intermediate leg member 205. When the lock pin 215 is installed through the intermediate leg member 205, the cotter pin 260 in combination with the spring 265 and a washer 270 operatively restrains the lock pin 215 from slipping out of the cradle bracket assembly 185. Referring specifically to FIG. 14, when not under any external forces aside of the bias of the spring 265, the lock pin 215 is biased in a laterally outward direction toward the locked position such that it extends at least partially through an opening 170 of the first leg member 160 of the bracket member 155.

Figure 10:
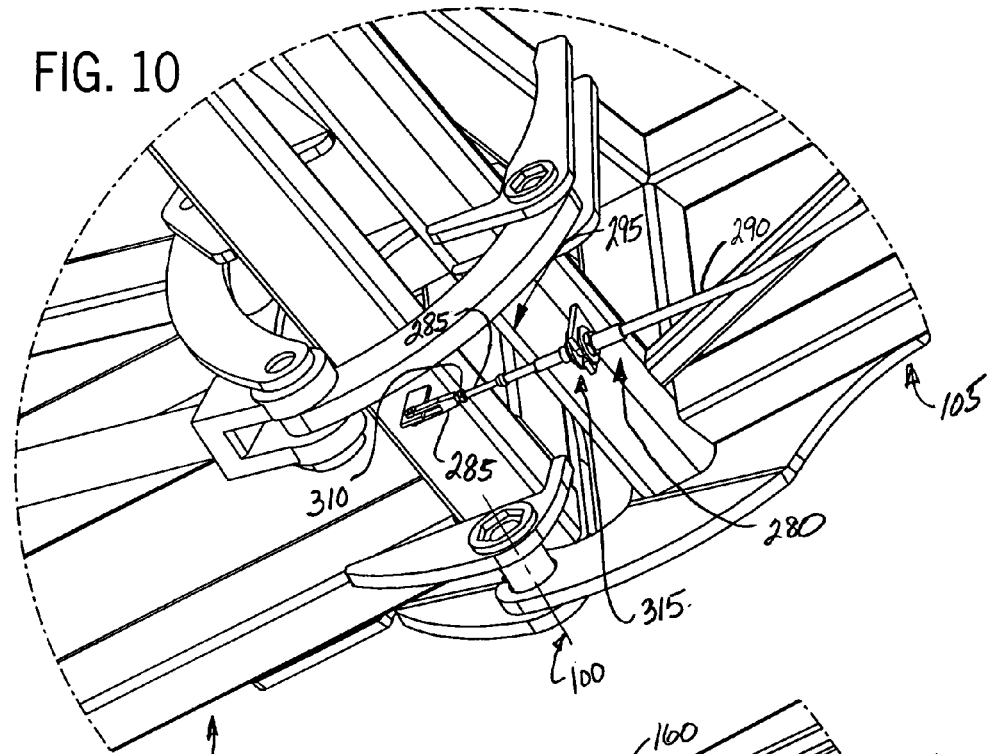
FIG. 10 illustrates a detailed perspective along line 10-10 in FIG. 7.
Figure 12:
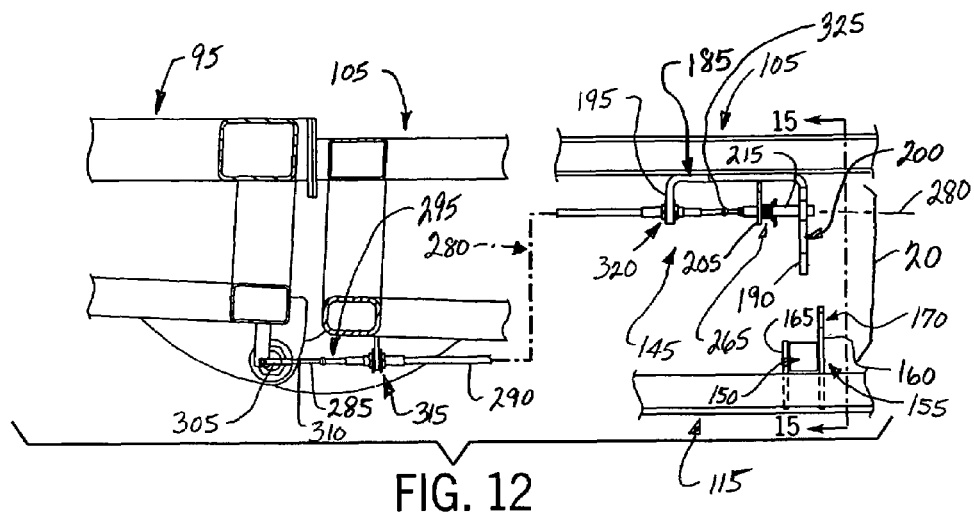
FIG. 12 illustrates a detailed schematic diagram of the lock assembly for the boom assembly approaching the first-stage folded position.

As illustrated in FIGS. 7-8, 10-12 and 17, the lock assembly 20 also includes a cable assembly 280 connected to automatically move the lock pin 215 from the locked position (FIG. 14) to the unlocked position (FIG. 12). The cable assembly 280 generally includes a cable 285 slidably disposed in a protective sleeve or shroud 290. The cable 285 generally includes a first end 295 (FIG. 10) and a second end 300 (FIG. 11). As shown in FIG. 7, the cable 285 has a length generally extends from the outer end of the inner section 95 to the second interlock portion 145 at the middle section 105 of the boom 70. Referring specifically to FIG. 10, the first end 295 of the cable assembly 280 includes a threaded portion receive at a yoke member 305 pivotally coupled at the inner section 95 of the boom 70. A jam nut 310 is attached by a threaded-connection to lock the position of the cable 285 relative to the yoke member 305. A first bulkhead assembly 315 is mounted to secure a first end of the protective sleeve 290 of the cable assembly 280 at the middle section 105 of the boom 70. Referring now to FIG. 11, a second bulkhead assembly 320 is mounted to secure the protective sleeve 290 of the cable assembly 280 at a slot 322 in the second leg member 195 of the cradle bracket assembly 185. Each bulkhead assembly 315 and 320 generally comprises washers and nuts that are operable to secure the protective sleeve 290 of the cable assembly 280 to the boom 70. The number and type of fasteners (e.g., clips, etc.) to secure the cable assembly 280 to the boom 70 can vary. The second end 300 of the cable 285 includes a threaded portion received at the aperture 230 (FIG. 17) of the lock pin 215. A jam nut 325 is connected to lock the location of the second end 300 of the cable 285 relative to the lock pin 215. With unfolding pivoting movement (See FIG. 2) of the middle section 105 from the second-stage folded position (FIG. 3) in a forward and laterally outward direction with respect to the inner section 95, the second end of the cable 285 is configured to automatically retract the lock pin 215 against the bias of the spring 265 from the locked position (FIG. 14) toward an unlocked position (FIG. 13) with respect to the first interlock portion 140.

Although the above-description of the lock assembly 20 is discussed in regard to operation of the left boom 70 of the boom assembly 30, it is understood that a lock assembly for the right boom 75 (See FIGS. 1-6) of the boom assembly 30 is constructed and operates in similar matter.

Figure 13:
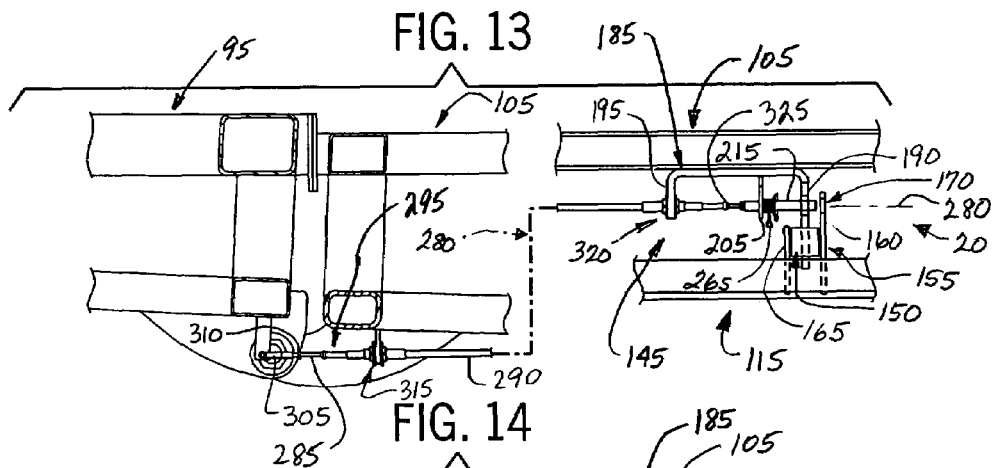
FIG. 13 illustrates a detailed schematic diagram of the lock assembly for the boom assembly in the full first-stage folded position shown in FIG. 3.

In operation, initially assume that the boom assembly 30 is disposed in the extended, operative position (See FIG. 1) such that the outer section 115 of the boom assembly 30 is generally aligned one hundred-eighty (180) degrees with respect to the middle section 105. At this extended position, the cable 285 exerts a retracting or pulling linear force so as to cause the lock pin 215 of the second interlock portion 145 to retract against the bias of the spring 265 toward the unlocked position (See FIG. 12). In the first stage of the folding sequence of the boom 70 (FIG. 2), the outer section 115 rotates forward and laterally inward toward the first-stage folded position (FIG. 3) with respect to the middle section 105. As the outer section 115 approaches the middle section 105 as shown in FIGS. 13 and 16, the recessed surface of the cradle bracket assembly 185 mounted at the middle section 105 engages and receives the roller member 150 rotatably supported at the outer section 115 in a manner so as to properly align the outer section 115 to rest on the middle section 105 in the first-stage folded position (FIG. 3). Referring to FIGS. 3 and 4, the second stage of the folding sequence includes the middle section 105 pivoting in a forward and laterally inward direction with respect to the inner section 95 toward the second-stage folded position (FIG. 4). As the alignment of middle section 105 pivots through a generally one hundred-eighty degrees±fifteen degrees (See FIG. 3) range of motion, the cable 285 automatically exerts a pushing or extending linear force that in combination with the spring 265 causes the lock pin 215 to move from the fully-unlocked position (FIG. 12) to the fully-locked position (FIG. 14). The jam nuts 310 and 325 are adjusted to position the cable 285 such that, as the middle section 105 pivots through an alignment of generally ninety (90) degrees (±15 degrees) (See FIG. 4) with respect to the inner section 95, the cable 285 exerts a pushing or extending linear force, and releases its retracting or pulling force applied at the lock pin 215, such that in combination with the bias force of the spring 265 moves the lock pin 215 through the opening 170 in the leg member 160 of the bracket member 155 at the outer section 115 to a fully locked position (See FIG. 14). Once the lock pin 215 is in the fully-locked position, the outer section 115 is restrained from dropping out of alignment or unfolding with respect to the middle section 105 as the boom assembly 30 continues through the folding sequence toward the second-stage folded position (See FIG. 5).

Figure 5:
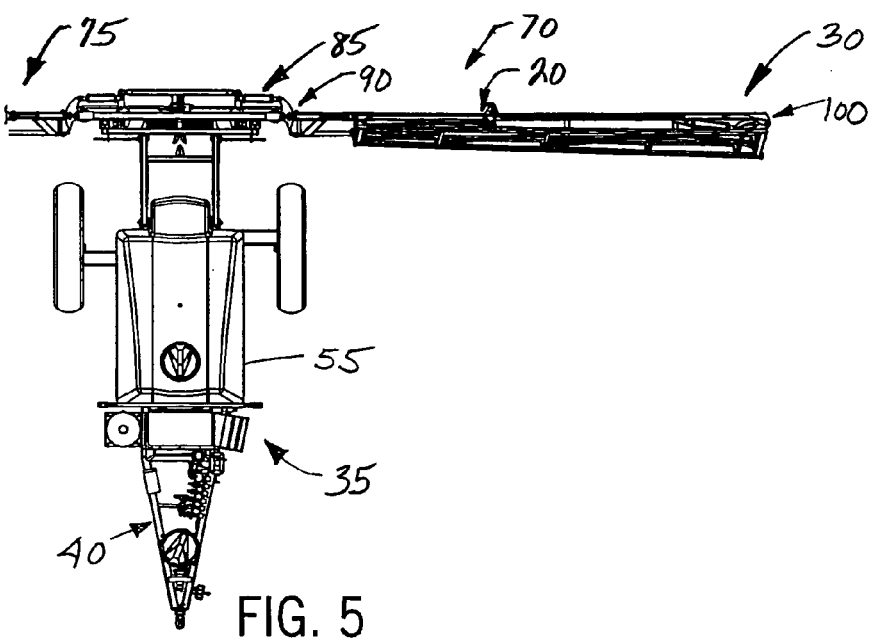
FIG. 5 illustrates a top plan view of the agricultural sprayer of FIG. 1, the boom assembly in a full, second stage folded position.

Once the lock pin 215 of the lock assembly 20 is in the fully-locked position (FIG. 14), the cradle bracket assembly 185 serves to support the roller member 150 and the outer boom section 115 on the middle section 105 in the second-stage folded position (See FIG. 5). The third stage of the folding sequence includes the inner boom section 95, the middle section 105 and the outer section 115 pivoting or folding in a forward and inward direction toward the main frame structure 40 of the implement 35 to a third-stage folded position ready for transport (See FIG. 6). In contrast, the outer sections of known boom assemblies are known to typically fall out of position or to unfold due to miscellaneous forces (e.g., gravity, etc.) as the boom assembly folds toward the transport position (See FIG. 6).

The sequence of stages in unfolding the boom assembly 30 from the transport position (FIG. 6) to the extended, operative position (FIG. 1) occur in similar manner to that described above. From the third-stage, transport position, the inner section 95 pivots in the radially outward direction away from the main frame structure 40 of the implement 35 to the second-stage folded position (See FIG. 5). From the second-stage folded position (See FIG. 5), the middle section 105 pivots in a radially outward direction with respect to the inner section 95. Similar to that described above, as the middle section 105 moves through a generally one hundred-eighty degrees±fifteen degrees (See FIG. 3) range of unfolding motion with respect to the inner section 95, the cable 285 automatically moves so as to exert a retracting linear force at the lock pin 215. As the middle section 105 reaches the generally perpendicular alignment of ninety (90) degrees±fifteen degrees with respect to the inner section 95 (See FIG. 4), the cable 280 applies a retracting or pulling force at the lock pin 215 against the bias of the spring 265 such that the lock pin 215 is removed or retracts from the opening 170 of the bracket member 155 at the outer boom section 115 (See FIG. 14). The cable 285 continues to apply the retracting force at the lock pin 215 toward the fully unlocked position (See FIG. 12) as the middle section 105 continues to pivot radially outward towards the fully extended position at a general alignment of one hundred-eighty (180) degree±ten degrees with respect to the inner section 95 (See FIG. 3). With the lock pin 215 in the fully-unlocked position and removed from the opening 170 of the bracket member 155 at the outer section 115 (See FIG. 12), the outer section 115 is free to pivot in a radially outward direction toward the fully-extended, operative position with respect to the middle section 105 (See FIGS. 1 and 2).

It is also conceived that the lock pin 215 can be removed from the cable 285 and the lock pin 215 be manually inserted in the opening 170 through the bracket member at the outer section 115 so as to restrain the outer section 115 in a folded position with respect to the middle section 105 in an extended position. In this manner, the implement 35 is configured for partial width spraying where only the inner section 95 and the middle section 105 are in the fully-extended position (See FIG. 3). With the lock pin 215 engaged through the opening in the 170 of the bracket member 155 at the outer section 115, the outer section 115 remains in the proper folded position with respect to the middle section 105 in the second-stage folded position (FIG. 3).

While the invention has been shown and described with respect to particular embodiments, it is understood that alternatives and modifications are possible and are contemplated as being within the scope of the present invention. For example, although the above described lock assembly 20 is described with reference to an agricultural sprayer implement 35, one skilled in the art will recognize that the present invention is not so limited. A wide variety of boom support vehicles and towed implements could include the lock assembly 20 constructed in accordance with the invention.

Many changes and modifications could be made to the invention without departing from the spirit thereof. The scope of these changes will become apparent from the appended claims.

We claim:

1. A lock assembly to secure a folding boom assembly, the folding boom assembly having a boom including an outer section that pivots about a first vertical axis with respect to a middle section, the middle section pivots about a second vertical axis with respect to an inner section, and the inner section pivots about a third vertical axis with respect to a boom support structure of the boom assembly, comprising:
a first interlock portion configured to be received by a second interlock portion when the outer section pivots laterally inward about the first vertical axis with respect to the middle section to a first stage folded position,
wherein as the outer and middle sections move from the first stage folded position laterally inward about the second vertical axis with respect to the inner section, the second interlock portion slidably moves and interlocks with the first interlock portion to restrain the outer section with respect to the middle section.

2. The lock assembly of claim 1, wherein the first interlock portion is mounted at the outer boom section and the second interlock portion is mounted at the middle boom section, and wherein the second interlock portion includes a lock pin that is slidably movable between an unlocked position and a locked position with respect to the first interlock portion to restrain the outer boom section with respect to the middle boom section.

3. The lock assembly of claim 2, wherein the lock pin is slidably actuated by a cable have a first end slidably movable with respect to the boom.

4. The lock assembly of claim 3, wherein the first end of the cable is attached at the lock pin, and wherein a second end of the cable is pivotally attached at the inner section of the boom.

5. The lock assembly of claim 4, wherein the second end of the cable is pivotally coupled by a yoke member to the inner section of the boom, and wherein the yoke member includes a threaded opening configured to receive the second end of the cable.

6. The lock assembly of claim 4, wherein a jam nut is configured to adjustably position the second end of the cable with respect to the yoke member.

7. The lock assembly of claim 2, wherein the lock pin is biased by a spring toward a locked position in engagement with the first interlock portion.

8. The lock assembly of claim 2, wherein the first interlock portion includes a cylindrical-shaped member, and wherein the second interlock portion includes a first bracket member having a recessed portion configured to receive the cylindrical-shaped member in the folded position of the outer section on the middle section of the boom.

9. The lock assembly of claim 2, wherein the first interlock portion includes a leg member having an opening extending therethrough, and wherein the opening is configured to align so as to receive the lock pin in the locked position.

10. An agricultural sprayer, comprising:
a boom support structure;
a boom assembly connected to and supported by the boom support structure, and having a boom that includes an outer section configured to pivot about a first vertical axis with respect to a middle section in a laterally inward direction to a first-stage folded position with respect to the boom support structure, wherein the middle section is configured to pivot about a second vertical axis in the laterally inward direction toward the boom support structure; and
a lock assembly including a cable having a first end pivotally coupled at the boom and a second end operatively connected to move a lock member from an unlocked position to a locked position so as to restrain the outer section with respect to the middle section when the outer and middle sections in the first stage folded position pivot in the laterally inward direction toward the boom support structure.

11. The sprayer of claim 10, wherein the lock assembly comprises:
a first interlock portion mounted at the outer section, the first interlock portion including a leg member and an opening therethrough,
wherein in the first stage folded position, the opening through the leg member is in alignment to receive the lock member therethrough, and
wherein as the outer and middle sections in the first stage folded position pivot about the second vertical axis in the laterally inward direction, the lock member slides through the opening in the leg member to the locked position.

12. The sprayer of claim 10, wherein the cable is slidably mounted in a protective sleeve so as to cause the lock member to automatically move from the unlocked position to the locked position when the outer section and the middle section in the first stage folded position pivot laterally inward with respect to the boom support structure.

13. The sprayer of claim 10, wherein the second end of the cable is threadedly attached at the lock member.

14. The sprayer of claim 10, wherein the first end of the cable is pivotally coupled by a yoke member to the boom, and wherein the yoke member includes a threaded opening configured to receive the first end of the cable.

15. The sprayer of claim 10, wherein the lock member is a pin which is biased by a spring toward the locked position.

16. The sprayer of claim 10, wherein the lock assembly includes a first interlock portion configured to be interlocked by the lock member with a second interlock portion in the locked position, the first interlock portion including a cylindrical member and the second interlock portion including a cradle bracket member having a recessed surface portion configured to receive the cylindrical member thereon in the first stage folded position.

17. A method of interlocking a multi-stage boom assembly having an inner section, a middle section located outward relative to the inner section, and an outer section located laterally outward from the inner and middle sections in the fully extended position of the boom assembly, the outer section pivotal about a first vertical axis with respect to the middle section and the middle section pivotal about a second vertical axis with respect to the inner section, the method comprising the steps of:
retracting a lock pin mounted at the middle section of the boom against a bias of a spring toward an unlocked position when the outer, middle and inner sections of the boom are disposed in an extended position;
pivoting the outer section about the first vertical axis toward a first stage folded position with respect to the middle section;
aligning an opening extending through a leg member mounted at the outer section to receive the lock pin mounted at the middle section when the outer section is disposed in the first stage folded position with respect to the middle section;
pivoting the middle section about the second vertical axis with respect to the inner section; and
moving a cable so as to cause the lock pin to move through the opening in the leg member at the outer section to a lock position,
wherein in the lock position, the lock pin restrains movement of the outer section with respect to the middle section.

18. The method as recited in claim 17, wherein a first end of the cable is pivotally mounted at the inner section and a second end of the cable is coupled at the lock pin, and further comprising the step of:

biasing the lock pin with the spring toward the locked position.

19. The method as recited in claim 17, wherein the step of aligning includes receiving a roller mounted at the outer section at a recessed surface of a cradle bracket member mounted at the middle section.

20. The method as recited in claim 19, further comprising the steps of:

pivoting the outer and middle sections about the second vertical axis in a laterally outward direction with respect to the inner section;

retracting the lock pin with the cable from the opening in the leg member at the outer section so as to allow the outer section to pivot freely with respect to the middle section.

* * * * *